US008431867B2

(12) United States Patent
Blanchard et al.

(10) Patent No.: US 8,431,867 B2
(45) Date of Patent: Apr. 30, 2013

(54) TRANSPARENT GLAZING PROVIDED WITH LAMINATED HEATING SYSTEM

(75) Inventors: Ariane Blanchard, Aachen (DE); Guenther Schall, Kreuzau (DE)

(73) Assignee: Saint-Gobain Glass France, Courbevoie (FR)

( * ) Notice: Subject to any disclaimer, the term of this patent is extended or adjusted under 35 U.S.C. 154(b) by 1163 days.

(21) Appl. No.: 12/161,586

(22) PCT Filed: Jan. 19, 2007

(86) PCT No.: PCT/FR2007/000112
§ 371 (c)(1),
(2), (4) Date: Dec. 22, 2008

(87) PCT Pub. No.: WO2007/083038
PCT Pub. Date: Jul. 26, 2007

(65) Prior Publication Data
US 2009/0166347 A1   Jul. 2, 2009

(30) Foreign Application Priority Data

Jan. 19, 2006  (DE) .................. 10 2006 002 636

(51) Int. Cl.
*H05B 3/03* (2006.01)
*H05B 3/26* (2006.01)
(52) U.S. Cl.
USPC ........... 219/203; 219/522; 219/541; 219/544; 52/171.2
(58) Field of Classification Search .................. None
See application file for complete search history.

(56) References Cited

U.S. PATENT DOCUMENTS

| 4,385,226 | A  | * | 5/1983  | Sauer ............................ 219/522 |
| 4,443,691 | A  | * | 4/1984  | Sauer ............................ 219/522 |
| 6,396,026 | B2 | * | 5/2002  | Gillner et al. ................. 219/203 |
| 7,132,625 | B2 | * | 11/2006 | Voeltzel ......................... 219/203 |
| 2002/0005398 | A1 | * | 1/2002 | Gillner et al. ................. 219/203 |
| 2003/0146199 | A1 | * | 8/2003 | Sol et al. ........................ 219/203 |
| 2010/0006555 | A1 | * | 1/2010 | Maurer et al. ................. 219/203 |
| 2010/0270280 | A1 | * | 10/2010 | Blanchard et al. ............ 219/203 |

FOREIGN PATENT DOCUMENTS

| DE | 19702448 A1 | * | 7/1998 |
| EP | 0 025 755 |   | 3/1981 |
| WO | WO 2006/040498 A1 |   | 4/2006 |

OTHER PUBLICATIONS

U.S. Appl. No. 12/528,128, filed Aug. 21, 2009, Blanchard, et al.

* cited by examiner

*Primary Examiner* — Joseph M Pelham
(74) *Attorney, Agent, or Firm* — Oblon, Spivak, McClelland, Maier & Neustadt, L.L.P.

(57) ABSTRACT

A transparent windowpane including a resistive heating coating that extends over a substantial part of a surface of the windowpane, and over a main field of view, and which is electrically connected, at least indirectly, with at least two busbars such that, when a power supply voltage is applied between the two busbars, a current flows between the busbars, heating a heating field in the heating coating. The heating field includes at least one semiresistive region in direct contact with at least one busbar, and including conducting strands in a form of thin longitudinal wires, the ohmic resistance of which is less than that of the heating coating. At least one conducting strand has a transverse conducting structure in electrical contact with the semiresistive region.

28 Claims, 3 Drawing Sheets

TRANSPARENT GLAZING PROVIDED WITH LAMINATED HEATING SYSTEM

Figure 1:
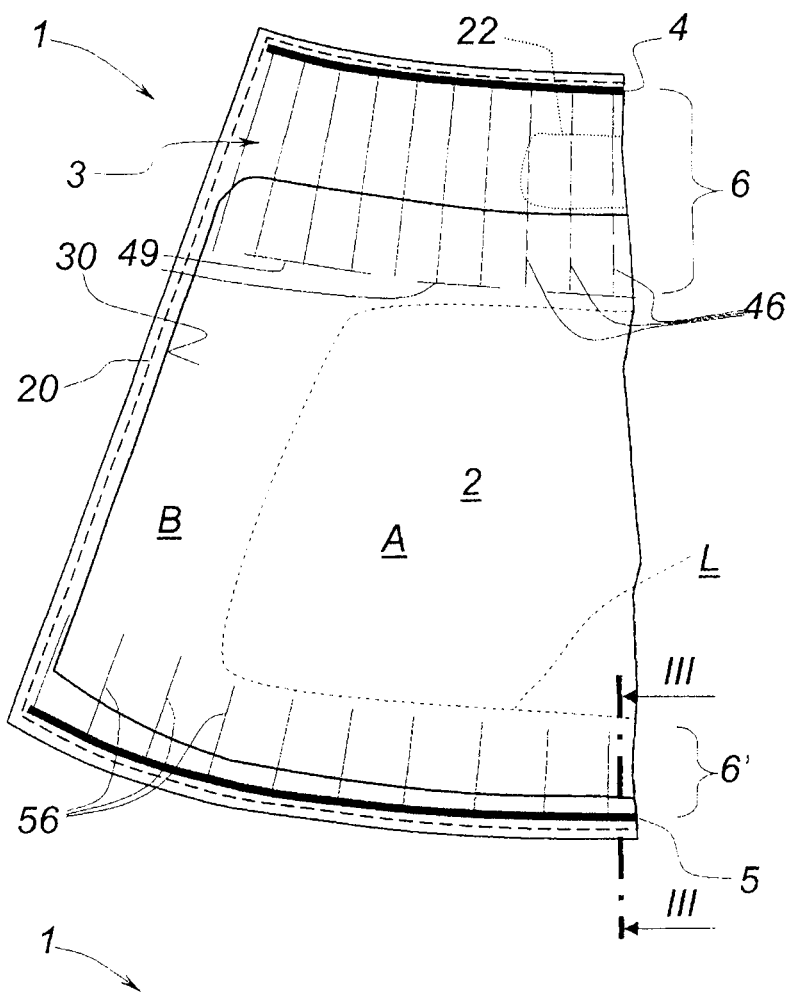

The invention relates to a transparent windowpane provided with a resistive laminated multilayer system producing an electrically heating coating possessing the features of the preamble of claim 1.

The invention relates more particularly to a windowpane whose resistive heating coating is a coating placed on a substrate and having thermal insulation and/or solar protection capabilities. Windowpanes incorporating this type of coating, when intended for equipping vehicles, make it possible in particular to reduce the air-conditioning load and/or reduce excess overheating ("solar control" windowpanes) and/or reduce the amount of energy dissipated to the outside ("low-emissivity" or "low-E" windowpanes) brought about by the ever-growing use of glazed surfaces in vehicle passenger compartments.

One type of multilayer known for giving substrates such properties consists of at least two metal layers, such as a silver-based layer, each placed between two coatings made of a dielectric. This multilayer is generally obtained by a succession of deposition operations carried out using a vacuum technique such as sputtering, optionally magnetically enhanced or magnetron sputtering. Two very thin metal layers, called "barrier layers", may also be provided, these being placed beneath, on or on each side of each silver layer, the underlayer as a tie, nucleation and/or protective layer, for protection during an optional heat treatment subsequent to the deposition, and the overlayer as protective or "sacrificial" layer so as to prevent the impairment of the silver if the oxide layer that surmounts it is deposited by sputtering in the presence of oxygen and/or if the multilayer undergoes a heat treatment subsequent to deposition.

In particular, there is a substantial demand from the market for heating versions of vehicle windshields, the heating means as such having to be the least perceptible or the least disruptive as possible from the visual standpoint. There is therefore an increasing demand for a transparent coating for heating windshields.

A general problem with laminated heating multilayer systems having a low light absorption is their relatively high surface resistance, which requires a high service voltage, which in any case is higher than the usual voltages onboard vehicles, always in the case of large dimensions of the windowpane to be heated or in the presence of long current paths. With existing laminated systems, a reduction in surface resistance would be accompanied by a reduction in visible light transmission since the (partial) conducting layers would have to be thicker.

These are the technical reasons why windowpanes heated by wires are still sometimes preferred, which wires can be supplied without any difficulty with the usual onboard voltage. However, such composite windowpanes with integrated heating regions formed from very thin wires (only a few microns in thickness) are not acceptable for all customers. Moreover, such windowpanes are relatively complicated to manufacture.

Patent DE 1 256 812 B1 discloses a glass pane that can be heated by means of a plane electrically conducting layer made of metal or metal oxide applied to its surface. This publication, with declaration priority of 1963, assumes a very high layer resistance of 200 $\Omega$/unit area. Nevertheless, to be able to heat this layer uniformly with a relatively low voltage from two lateral busbars of low resistance, narrow printed low-resistance electrodes in the form of a comb are provided that extend from said busbars over the entire field of view of the windowpane. These combs have mutually alternating polarities. They terminate respectively only a short distance from the opposed busbar. It is true that, thanks to this, the heating current in the transverse direction relative to the longitudinal projection of the individual lines of the comb electrodes has to travel only a relatively short path within the layer.

The advantage that is mentioned in that document compared with windowpanes heated only using narrow printed heating conductors is the uniform heating power with relatively high mutual separations between the comb electrodes.

However, said lines of the hatched type impede the transparency and the visual effect of the general field of view of the windowpane thus produced. The visual advantage of a transparent heating layer remains unexploited. Such a windowpane is only provided as rear windows for automobiles. It is currently not permitted for use as windshields, as these must in no way impede visibility in a standardized main field of view called "field of view A".

Another problem with heating coatings may arise owing to the fact that they are sometimes not able to be applied uniformly over the entire surface of the transparent pane on which they are deposited, but one or more interruptions, called "communication windows", have to be provided therein, which disturb the flow of the heating current and possibly form "hot spots" (local overheating) along their edges. Such communication windows serve to make the coating, which by nature is reflective for short-wave or infrared radiation, locally more permeable to certain datastreams or signals.

At least one pair of electrodes (in the form of bands) or of busbars, which have to inject as uniformly as possible the current into the laminated surface and to distribute it over a wider front, is provided in order to inject and extract the heating current in such coatings. In the case of vehicle windowpanes, which are considerably wider than their height, the busbars are generally along the longer edges (in the mounted position, the upper and lower edges) of the windowpane so that the heating current can travel along the shortest path over the height of the windowpane. At the same time, the aforementioned communication windows are generally located at the upper edge of the windowpane and extend there over several centimeters of width.

Document WO 00/72635 A1 discloses a transparent substrate provided with a coating that reflects IR rays and with a communication window produced by surface removal or omission of the coating.

Any communication window that modifies the uniformity of the coating visibly disturbs the current flow. Local temperature peaks ("hot spots") appear, which may result in damage to the substrate (thermal stresses) and to the coating itself. This is not only the case when the coating is absent over a large area, but also when the communication window is formed by a relatively large number of individual slots that are not attached to one another. These also produce, in the surface region in question, an appreciable increase in the resistance of the layer and at the same time also give rise to the abovementioned hot spots.

The last document mentioned proposes, as a means of reducing the disturbing effect of a communication window of large area, the provision, on the edge of the latter, of an electrically conducting band that has an ohmic resistance per unit area that is considerably lower than that of the heating coating. This band must divert the currents around the cut. A communication window is preferably entirely flanked by such a band. The band may be produced by printing a silver-containing conductive screen-printing paste and by baking it.

However, it may also be placed by applying an electrically conducting lacquer or by depositing a metal band. In all cases, an electrically conducting connection between the band and the coating is of course necessary in order for it to operate.

The band may be concealed from view by superposing an electrically nonconducting opaque masking strip, for example made of black enamel. As a general rule, such masking strips are made up from a black-colored nonconducting material that can be baked (screen-printing paste). Infrared radiation is not reflected by this material, but absorbed.

Patent DE 103 33 618 B3 discloses a transparent windowpane provided with a heating coating in which a communication window is provided. To electrically short-circuit this for the heating current, a coating connected directly to one of the common conductors in a material whose ohmic resistance is lower than the surface resistance of the heating coating is provided. The coating extends only along part of the busbar. It is produced in an opaque, and preferably printable, material, which has a number of slots or other cut-outs.

Patent DE 198 29 151 C1 discloses a method for establishing electrical contact with a conducting thin-film multilayer system on a glass pane with which, to circumvent the high resistance, a dielectric protective layer of the laminated system is produced by ultrasonically welding points of contact between the busbars and the actual conducting layer.

Patent WO 03/024155 A2 discloses, for this purpose, a transparent windowpane provided with a heating coating for which a maximum service voltage of 42 V is indicated, but which also tries to solve the problem of "hot spots" along the edges of a communication window. In general, several different voltage levels are used, a lower voltage being applied to the shorter current paths (for example because of the communication window) so as to avoid local overheating. The communication window region is especially not covered in the heating surface, by placing a special busbar between the communication window and the busbar located on the opposite side.

A large number of examples intended to subdivide the heating coatings of a vehicle windshield are also known from patent DE 36 44 297 A1. According to that document, the subdivisions may be produced by plane sections free of layers and/or by notches produced mechanically or by a laser beam. They are used for suitably adjusting and deflecting a current flow within the coated surface and have to ensure as uniform as possible a current density in the surfaces in question.

Patent WO 2004/032569 A2 discloses another configuration of a transparent pane provided with a heating coating which also aims to achieve uniformity of the heating power in the surface by providing separating lines incorporated into the coating.

Patent DE 29 36 398 A1 relates to measures intended to prevent current spikes at the transition between the busbars and the coating on a transparent pane provided with a heating coating. The main objective is to reduce the enormous difference in resistance between the coating and the busbars using materials or shapes having higher resistivity for the latter, or else those of intermediate resistance. Surface resistances between 1 and 10 ohms per unit area are indicated for the coating in that document. In an alternative solution taken from several that are described therein, the edge of each busbar turned toward the opposite busbar is of corrugated shape. The purpose here is to avoid the formation of sharp points turned toward the heating coating. The objective of this approach is to appreciably lengthen the line of transition between the busbar and the coating, and thus to reduce the current density in this transition. However, all these measures seem poorly suited to supplying the heating layer with a relatively low voltage.

It is also known to provide, on the light-incident face of photovoltaic solar cells, grid or comb electrodes (see for example WO 03/075351 A1). They are often produced by screen printing and are composed of a busbar placed along the edge of the solar cell and of a plurality of very narrow comb teeth that extend over the area of the solar cell starting from the busbar. These electrodes allow surface connection for the photovoltaic voltage that is applied on both sides of the surface of the absorber or between the comb electrode on the front side and the rear metal electrode covering the entire surface, and do so without greatly reducing the penetration of light into the absorber.

Patent DE 197 02 448 A1 discloses a heated mirror on the glass body of which two conducting bands or electrodes are placed, these being produced in comb form and meshed, one in the other, with a PTC coating that covers them and fills the intermediate spaces between the teeth of the combs. However, that document does not consider the problem of making the heating configuration visually imperceptible, since the conducting tracks and the heating layer may be placed behind the reflecting layer.

Patent DE 198 32 228 A1 discloses a vehicle pane provided with an electrically conducting but visually transparent coating used as an antenna. High-frequency electromagnetic signals are picked up by the antenna layer purely capacitively by means of a coupling electrode that is made up of several fine wires connected together, which are placed parallel to one another and a distance apart that is large compared with their diameter and extend from the edge into the field of view of the pane and terminate blindly therein. There is no galvanic coupling between the coating and these wires as they lie respectively in different planes of the composite glass. The wires of the coupling electrode may be applied to the surface of the pane by means of a transfer film. The latter operation is described in greater detail in patent DE 43 32 320 C1.

The busbars already mentioned several times may be produced on the pane equally well by printing or screen printing, before or after application of the coating, or by soldering thin metal strips, preferably made of tinned copper. Combinations of printed busbars and metal-strip busbars are also known (see for example document DE 198 29 151 C1). Admittedly, the busbars are generally produced in the form of narrow strips, but they are not transparent. Consequently, for optical reasons, they are each time placed near the outer edge of the transparent panes in question. In general, they may be concealed by opaque border coatings (which are themselves also generally produced by screen printing). The aforementioned communication windows may also be concealed by these border coatings, provided that they are sufficiently permeable to the radiation to be transmitted.

In standard vehicle windshields, these opaque coatings are produced in the form of a peripheral frame, one additional function of which is that of protecting the bonded joint between the windowpane and the bodywork from UV radiation. These frames surround the general field of view of the windowpane. In the case of windshields, a distinction may also be made between a main field of view A, at the center of the area of the windowpane in which there must be absolutely no impediment to visibility (for example colorations, wires or other damage), and the secondary field of view B, which is closer to the edge.

The object of the invention is to produce a transparent windowpane provided with a transparent heating coating that can operate with relatively low service voltages (of the order of 12 V), while barely affecting the transparency and in any case guarantees uniform heat distribution.

According to the invention, this object is achieved by the features of claim 1. The features of the secondary claims indicate advantageous improvements of this invention.

The transparent windowpane according to the invention is provided with the resistive heating coating that extends over a substantial part of a surface of the windowpane, especially over a main field of view (A), and which is electrically connected, at least indirectly, with at least two busbars in such a way that, when a power supply voltage is applied between the two busbars, a current flows between the busbars, heating a heating field in said heating coating. The heating field includes at least one semiresistive region in direct contact with at least one busbar and including conducting strands produced in the form of thin longitudinal wires, the ohmic resistance of which is less than that of the heating coating.

According to the invention, at least one conducting strand of the semiresistive region has a transverse conducting structure in electrical contact with said semiresistive region, and therefore, directly or indirectly, in contact with the heating coating. This conducting structure extends transversely to the longitudinal wire of the conducting strand to which it electrically connected. This transverse conducting structure is preferably positioned at that end of the conducting strand which is furthest away from the busbar to which the conducting strand is connected. However, it need not be at this end, but before this end, in the direction of the busbar to which the conducting strand is connected.

In a variant, this transverse conducting structure is preferably furthermore in electrical contact with several conducting strands.

Moreover, said semiresistive region may include several transverse conducting structures.

One or more transverse conducting structures may be in the form of one or more lines, using electrical wires, especially tungsten wires, and/or one or more bands, especially one or more copper bands and especially one or more tinned copper bands.

It is known that current highly transparent laminated thin-film multilayer heating systems possess at least one conducting metal layer flanked by one or more dielectric protective layers (antireflection layers) which are themselves either nonconductors or poor conductors of electricity and may impede the currents transverse to the plane of the layers, even if they are only a few nanometers in thickness.

This is the reason why a solution is also proposed that allows the passage of the current into the conducting layer of the heating coating to be improved.

In what follows, mention will always be made of only one conducting layer, but without in any way intending to exclude from the field of application of the invention laminated multilayer systems provided with several conducting partial layers. These partial layers are generally metallic and usually based on silver. However, the invention may in principle be realized with any type of transparent conducting monolayer heating coating or with a stack of one or more conducting layers and dielectric layers that are transparent or made transparent. The dielectric layer may also be itself a multilayer. However, for the sake of simplification, here again only a single dielectric layer will be mentioned, but without intending to exclude multiple layers.

It is true that it is technically possible to deposit the laminated heating system on a pane already provided with applied wires. Sufficient electrical contact between the relatively thin conducting layer and the electrical wires may be obtained with great certainty. However, this procedure requires greater effort, not justifiable from the industrial standpoint, as in all cases the substrates can no longer be coated over a large area and then cut up, rather the coating must be deposited on the already finalized substrates.

In one practical solution, the wires applied to the existing laminated system may be certainly in contact with the conducting layer by transpiercing said dielectric layer at the points of contact so as to guarantee a low current flow between the wire and the laminated system.

As the transparent windowpane is produced in the preferential form of a composite windowpane, the laminated system itself being deposited on a surface within the composite, the thin wires lie within the composite, and are therefore also protected. For example, they are fixed in a known manner to a composite adhesive film or to a transfer film or to an adhesive sheet and then applied to the heating coating.

The contact points are preferably applied in such a way that the heating current must travel the shortest possible paths over the laminated heating system, that is to say in general to the external end of the wires or as far as possible from the busbars that extend along the edge of the windowpane. However, this does not exclude also providing contact points closer to the busbars or providing the wires with several contact points near the conducting layer.

The wire-shaped conducting elements terminate, blindly, before the boundaries of the main field of view A. They may also be placed in the form of loops. Unlike patent DE 1 256 812, there are no intermeshing conducting elements of reverse polarity. In the region of the central field of view and the field of heating, the current, after the voltage has been applied, flows essentially in the normal direction to the common conductors or parallel to the overall longitudinal projection of the conducting strands terminating blindly. The term "overall longitudinal projection" denotes here the general direction in which the conductors lie within the heating field, starting from the busbars, and independently of their specific form.

These features and arrangements make it possible to achieve a relative shortening of the current flow path within the heating coating with a relatively high resistance since part of the distance between the actual busbars and the central main heating field is short-circuited by wire sections produced in the form of auxiliary conductors of (relatively) low resistance. This may also be considered as bringing the busbars electrically closer together.

However, the actual main (central) field of view A of the windowpane is not disturbed here. The regions occupied by the conducting elements or conducting surfaces other than the heating coating cover only part (on the side of the edge) of the heating field along the busbars.

Several options are offered for producing the points of contact between the wires and the conducting layer and thus promoting the current flow. It is possible to let the wires transpierce the dielectric layer by a mechanical effect (rubbing, oscillation, ultrasound effect). As regards the process, this may be obtained by mechanical pressure on the tip of the wire with which to establish the contact against the coating, simultaneously initiating an oscillation (at high frequency).

Another option consists in providing, at the contact points, an additional conducting material of low electrical resistance that is in contact with the conducting layer and passes through the dielectric protective layer toward the wires so that this material forms a conducting bridge between the corresponding wire and the conducting layer. No direct contact between the wire and the conducting layer is then necessary.

The additional conducting material may preferably be applied by screen printing, but also by any other technique such as inkjet printing, photolithography, etc., the techniques to be preferred being those with which the applied material is the least perceptible as possible from the visual standpoint.

Unlike the thin films of the laminated heating system, the additional material can currently be applied only using the thick film technique with high proportions of material, making it illusory to wish to make these material applications themselves transparent or even completely invisible. Consequently, they will be produced with a film thickness or a point thickness as small as possible. Nor is it necessary for them to be excessively raised above the general surface of the laminated system, but only so that they can reliably be brought into contact with the wires.

Another option for establishing point contacts between the wires and the conducting layer is a kind of sandwich with which the wire is pinched between the sections of a base film band and a protective film band. The base film band may be connected to the conducting layer in a known manner, by ultrasonic welding, and the protective film band is then welded to the latter.

According to the invention, the wires may be placed in a simple position or as a loop with straight, curved or undulating lines, a transfer film, known per se, being able to be used for depositing them on the laminated system.

In one advantageous embodiment of the invention, it may prove to be judicious to configure the applications of additional material not only in the form of discrete contact points, but also in the form of current distributors. This should be interpreted as the fact that the material itself extends beyond the actual point of contact with the wire and forms a miniature busbar with which the current can be transferred into the laminated system or extracted therefrom over an enlarged front.

In another development of this variant, bridges of additional material may also electrically connect together wires that lie alongside one another. The transverse extents of the bands of additional material that result therefrom and are large compared with the thicknesses of the wires (a few microns) may possibly be concealed sufficiently discreetly by means of opaque or tinted bands, unless they are by themselves sufficiently discreet not to be obstructive.

In addition to this, it is of course also possible to combine the heating wire conductors with other measures for electrically shortening the electrical distance between the busbars if one of them is not sufficient by itself to ensure the desired success or if other reflections or constraints make this necessary.

The regions in the form of bands of the coating covered by the wires may thus be produced with a higher conductivity. Such a locally increased conductivity may be obtained, for example, by higher thicknesses of conducting layers in an existing system or by locally adding additional conducting/metal layers. However, experience has shown that this is accompanied by a slight reduction in light transmission. In the case of vehicle windshields, these band-shaped regions would themselves extend at most up to the boundary of the central field of view so as to guarantee therein the high, required and recommended light transmission (75% of visible light).

It is also conceivable to use the adhesive intermediate layer of a composite windowpane for the local reduction in resistance according to the invention. To do this, it must be made electrically conducting in the surface regions provided for this purpose. This may be obtained, for example, by mixing a plastic film with electrically conducting particles that come into conducting contact with the heating coating and locally short-circuit it. This may also be tied to a certain reduction in light transmission which, it is true, tints the windowpane more deeply in this region, but does not make it opaque.

A secondary effect of this measure is an additional reduction in the resistance of the transition between the busbar and the heating coating by greatly increasing the contact areas. Another consequence is a reduction in the voltage needed to make the heating current flow over the heating surface.

It is true that this embodiment is very preferably used for windshields for which good transparency in the central region of the coating is important for completely safe driving. However, the heating windowpanes according to the invention may also be mounted in other places in automobiles as well as in other moving craft and machines, and also in buildings.

Although in conventional solar cells equipped with grid or comb electrodes the voltage is applied to the thickness of the absorbent layer, with the application according to the invention a voltage is applied with the objective of making a current flow in the surface of the heating coating. The conducting elements according to the invention thus have the effect of bringing the busbars, as usual placed at the edge of the windowpane, electrically closer together but without however substantially affecting the field of view of the windowpane.

Used in vehicles, the embodiment according to the invention especially allows windshield heating to be supplied directly with the 12 to 14 V DC voltage generally present onboard, the latter of course facing a heating coating having the lowest possible ohmic resistance. The length of the auxiliary wire conductor is chosen according to the actual surface resistance of the corresponding coating—the more conducting the coating, the shorter or narrower the auxiliary conductors may be.

This configuration nevertheless makes it possible to keep the coating over the entire surface of the transparent windowpane, with the exception of the communication windows to be optionally provided, so that no masking or layer removal measures are necessary. The positive properties of the coating, namely in particular the reflection of infrared radiation (thermal insulation) and uniform coloration, are thus preserved over the entire surface.

The regions with increased conductivity of the coating have only a very slight effect on the transparency of the windowpane, since even if discrete conducting elements or grid elements are provided, these are produced so as to be as thin as possible and to be scarcely perceptible visually.

If the additional conducting material is applied by screen printing, this application may take place before or after deposition of the laminated system on a substrate (glass or plastic pane, or even a plastic film). This operation may take place in a single step with application of the actual busbars. In both cases, a sufficiently secure electrical contact is made between the material and the conducting layer.

It is also possible to short-circuit with the wires a communication window provided in the coating approximately at the edge of the windowpane without having to dread the appearance of hot spots. The currents in the known problematic regions at the lateral edges of such communication windows are greatly reduced by the wires.

Other features and advantages of the subject matter of the invention will become apparent from the drawing of the exemplary embodiments in the form of a vehicle windshield and from the following detailed description of them.

Figure 2:
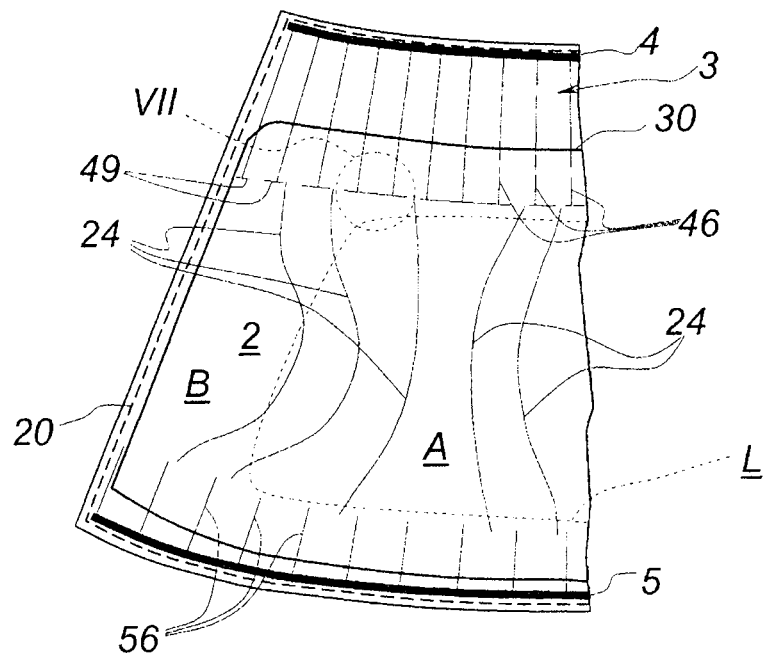
Figure 3:
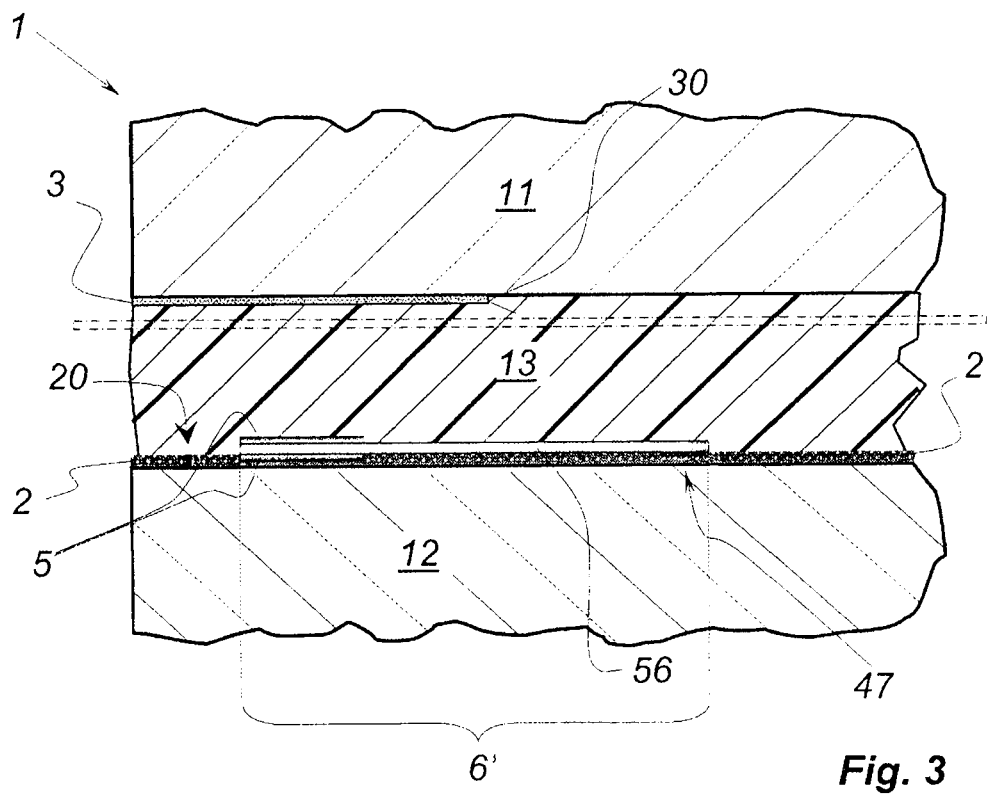
Figure 4:
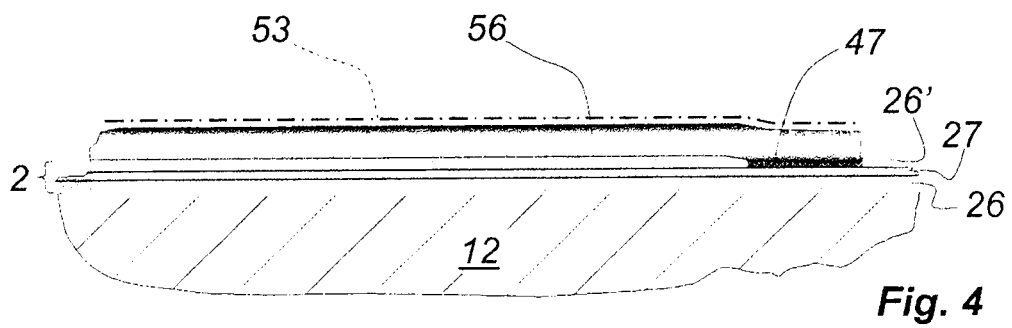
Figure 5:
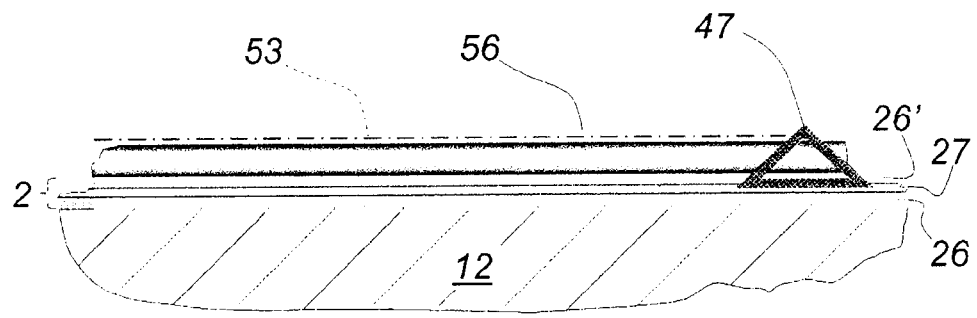
Figure 6:
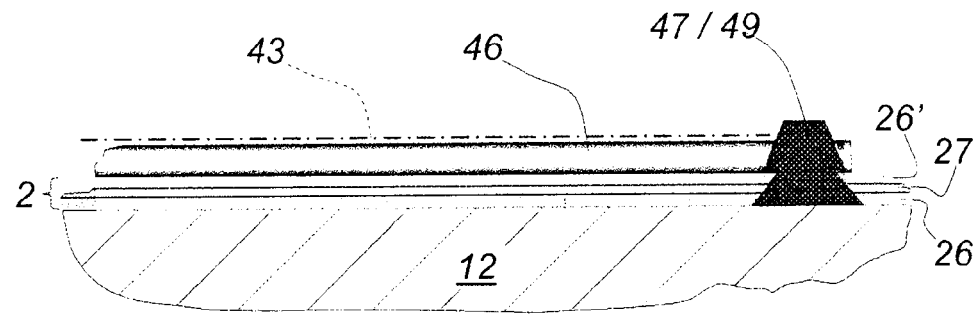

The figures illustrate, in simplified representation and not to scale:

FIG. 1: one embodiment of a transparent windowpane provided with a heating coating having band-shaped busbars connected with grid or conducting elements of strip type that extend in the surface of the windowpane;

FIG. 2: another embodiment, the heating coating of which is divided into current branches by means of separating lines and with which the current distributors are produced in the form of contact points;

FIG. 3: a partial cross-sectional view through a windowpane according to the invention along the line III-III in FIG. 1;

FIG. 4: a detail of FIG. 3 with a point of contact between a wire and a conducting layer of the laminated heating system;

FIG. 5: an alternative embodiment of a contact point according to FIG. 4;

FIG. 6: a second alternative embodiment of a contact point; and

Figure 7:
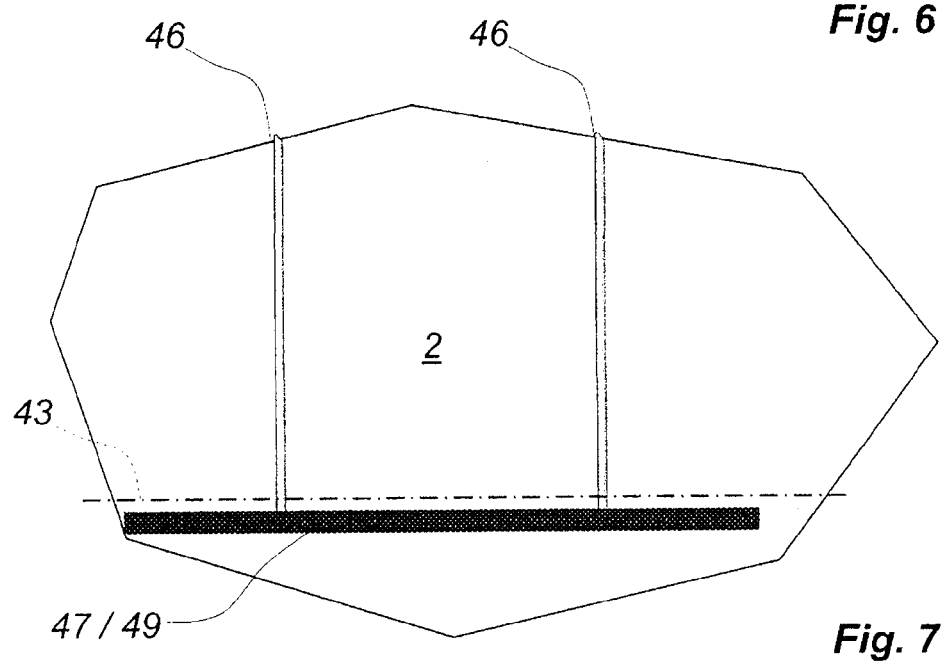

FIG. 7: an enlarged view of a contact point according to FIGS. 2 and 6.

In FIG. 1, a heating composite windowpane 1 having an essentially trapezoidal (curved) outline incorporates, in a known manner in a resistive and electrically conducting, transparent heating coating 2 over its entire surface. Only one half of the windowpane 1 is shown here, its other half being produced in an identical manner.

A dotted line denoted by 20 indicates that the outer edge of the surface of the continuous heating coating is on all sides slightly set back toward the interior with respect to the outer edge of the composite windowpane 1 or that a border strip is detached from the coating covering the entire surface. What is thus obtained is, on the one hand, electrical isolation with respect to the outside and, on the other hand, protection for the coating against damage due to corrosion coming from the outside. The outer edge 20 may be set back by removing the coating along the edge of the windowpane, by masking the substrate before the coating is deposited, or else by inserting a separating line that passes through the coating and extends along the outer edge of the windowpane, which may be sufficient for isolation and corrosion protection.

The laminated system itself is preferably, and in a manner known per se, a laminated system that can withstand large thermal stresses, which includes at least one metal layer that withstands, without being damaged, that is to say without degradation of its optical, heat reflection and electrical properties, the temperatures above 650° C. that are necessary for bending the glass panes. Apart from one or more metal layers (preferably based on silver), the laminated system also includes other layers such as dielectric antireflection layers and optionally blocking or protective layers, which are again dielectric layers.

Other electrically conducting laminated systems withstanding lower temperatures may however be used within the context of the present invention, especially also laminated systems that are deposited not directly on a pane made of glass or rigid plastic, but on a plastic film (preferably a PET film). All these laminated systems are preferably deposited by sputtering (magnetron sputtering).

The surface resistance of the standard laminated systems of the art mentioned here is between 2, or even 1, and 5Ω per unit area. Vehicle windshields provided with such laminated systems must overall achieve a light transmission of at least 75%, while still providing protection against solar thermal radiation, called a "solar control function".

The composition and the manufacture of the laminated thin-film multilayer system are however of secondary importance here, and it will therefore be unnecessary to discuss them in further detail.

Applied along the edge of the composite windowpane 1 is an opaque colored layer 3 in the form of a frame, the inner edge 30 of which defines the overall field of view of the transparent windowpane 1. Said layer 3 may lie in a different plane (to the inside or to the outside of the composite) of the composite windowpane than the heating coating 2. It serves as a layer for protecting against UV radiation for a bead of adhesive with which the finished windowpane is bonded in the opening of the vehicle body. It may also conceal from view connection elements for additional electrical functions of the windowpane 1.

Thus, FIG. 1 shows a first busbar 4 along the upper edge of the composite windowpane 1 in that region of the surface which is covered by the colored layer 3 and a second busbar 5 along the lower edge. The two busbars 4 and 5 are electrically connected in a known manner directly to the heating coating 2. However, it is not absolutely essential within the context of the present invention to establish a direct electrical contact between the busbars and the heating coating, as the heating currents may also reach the heating coating solely via a semiresistive region (6, 6').

One half of a communication window 22 has also been suggested, beneath the busbar 4, in the center of the windowpane, said communication window also being covered by the colored layer 3 and thus being concealed from view.

Many vehicle windshields are equipped along their upper edge with a tinted but transparent band (a "band filter"), not shown here, which in particular prevents dazzling by solar radiation. Furthermore, such a band may also help to conceal from view certain components or functional components of the windowpane in question (for example the communication window or its edges). Part of the width of the band may also replace the colored layer 3 along the upper edge of the windowpane or may be provided as a complement to said layer.

The composite windowpane 1 is generally made up of two rigid glass and/or plastic panes and an adhesive layer that joins them together via their surface. The busbars 4 and 5 are deposited on the adhesive layer (for example a thermoplastic adhesive film made of polyvinyl butyral (PVB), ethylene/vinylacetate (EVA), or also polyurethane (PU)) and are fastened to its surface before the adhesive layer is assembled and bonded to the rigid panes.

The busbars 4 and 5 may consist of thin narrow strips of metal film (copper, aluminum) that are generally fastened beforehand to the adhesive film and are deposited with electrical contact on the laminated system during assembly of the composite layers. However, the electrical contact may also be guaranteed by soldering the busbars 4 and 5. Good contact between the busbars and the laminated system is obtained in a later autoclave process under the effect of heat and pressure.

As already mentioned, the busbars 4 and 5 may, alternatively or complementarily, be produced by printing a conducting paste, which is fired while the glass pane is being bent. This solution is also considerably less complicated than depositing sections of metal strip. However, busbars printed in continuous industrial manufacture have an ohmic resistance greater than that of metal film strips. Consequently, the decision to use metal film or screen-printed busbars depends only on the individual type of pane and possibly on the total resistance of the heating multilayer system.

Compared with the heating coating 2, the busbars always have negligible ohmic resistance and do not heat appreciably during the heating operation.

It is possible to provide in the composite windowpane 1, in a manner known per se, two (or even more) heating fields that may be electrically supplied separately (with a vertical separation, for example in the center of the windowpane), which fields must of course also be connected via separate external terminals to the corresponding voltage source. In this case, it is possible to use a common ground conductor for the two heating fields, so that only the busbar 4 or the busbar 5 is to be divided into two sections, while the other one is continuous. Four external terminals are necessary in the first variant, only three in the second.

The external terminals will not be discussed in further detail here, as these have been described in various ways in the prior art.

The field of view called A of the windshield is suggested schematically by a dot-dash line L within the overall field of view defined by the edge 30 of the colored layer 3. The line L is not an actual or similar edge in the windowpane or the laminated system, but serves merely to provide a visual indication of the approximate position of the envisioned field of view A. The latter is defined in Annex 18 of ECE R43 by means of certain parameters of any environment of a vehicle. Any type of restriction on the visibility is prohibited within this field. The secondary field of view B, in which slight restrictions on visibility by integrated and similar elements are tolerated, extends around the outside of the field A.

An array of conducting strands 46 in the form of wires extends from the upper busbar 4 into a semiresistive band or region 6 within the overall field of view of the composite windowpane 1 from the border region covered by the colored layer 3 toward the interior of the field of view B. They terminate blindly or terminate in a transverse conducting structure 49, also in the form of wires in the field of view B, relatively far from the external boundary L of the field of view A. They represent auxiliary conductors that are electrically connected to the busbar 4 and to the heating coating 2 and are of low resistance in comparison with the latter. A number of them also short-circuit the communication window 22, thereby making it possible to guarantee direct electrical supply even from the busbar 4 for the surface of the heating coating 2 that lies on the other side of the communication window. From the visual standpoint, they are concealed on one side by the colored layer 3. As already indicated, a further concealment may be obtained by a tinted colored band (band filter), which is not shown here.

Conducting strands 56 in the form of wires also extend into a semiresistive band or region 6' within the field of view B of the composite windowpane 1 from the lower busbar 5.

On one side, it is not absolutely essential to provide such strands 46, 56 on both busbars 4 and 5. If strands 46 and 56 are provided on both sides, they therefore in no case extend far enough for wires of opposed polarity to be able to join up or be superposed in the transverse projection with respect to their overall longitudinal projection. The central part of the field of view and the field of heating (at least the field of view A) thus remains transparent and unaffected.

The semiresistive regions 6 and/or 6' form overall regions having an effective electrical conductivity appreciably greater than the heating coating 2. Connections in parallel with the heating coating 2 itself and strands 46 or 56 are produced in these regions. Although with conventional panes with coating heating of this type, throughout the space between the busbars, the heating current must flow only over the coating, in accordance with the present invention this distance may be shortened by the width of the regions 6 and/or 6' to values between 50 and 80% by means of the regions 6 and 6' depending on the extent of the field of view A, a partial amount of current short-circuiting the remaining distance in the strands and being suitably distributed within the field of view A thanks to the transverse conducting structures 49. In the main field of view of the windowpane, the current essentially flows perpendicular to the busbars 4 and 5 and parallel to the longitudinal orientation of the strands 46/56.

However, there always remains a current flow, even though small, over the entire surface of the heating coating, even in the regions between the strands 46 and 56, since the busbars cannot be separated from the heating coating in the sections between the grid elements. However, this current flow cannot cause hot spots to form at the edges of the communication window 22.

The lengths and mutual separations of the strands 46 and 56, their number, and also the dimensions of the busbars, can be represented here only schematically. The relative dimensions are however recognizable. Although the actual busbars 4 and 5 are produced in the form of the usual band several millimeters in width, the strands 46 and 56, and also the transverse conducting structures 49, are as thin as possible and visually discreet, but nevertheless appreciably longer than the widths of the busbars. The wires of this type are usually made of tungsten, which material still retains a very high mechanical strength even when the wires have an extremely small thickness.

It is true that the individual configuration in a specific composite windowpane may be defined in advance approximately by simulations, but it does however remain very dependent on the size or dimensions of the specific windowpane, on the type of construction of the busbars and on the electrical properties of the actual coating.

It may also be sufficient, for example, to combine only one of the busbars with strands 46 and transverse conducting structures 49. A short relative distance between the two busbars 4 and 5 may even allow the wires themselves to be shortened.

Mutual separations of 25 mm between the individual wires have been determined as being useable for one specific type of windowpane. The surface heating power levels available for a given resistance of the wires may however be adjusted according to the requirements by varying the separations. In addition, only a configuration with the wires straight has been shown here for the sake of simplification. This does not exclude producing them in practice as curved and/or wavy lines, or in the form of loops, which are if possible less obvious.

The present description applies in the same sense also to the options, already mentioned above but not illustrated here, of producing the regions 6 and/or 6' in the form of surface regions of the heating coating 2 having a greater conductivity or in the form of a region rendered conducting of the intermediate layer in a composite windowpane. Owing to their uniform distribution over the surface in the regions 6 and/or 6', these arrangements may be slightly less visually perceptible than discrete wires, even if they are accompanied with a slight tinting of the windowpane. However, such tinting, combined with the wires, may additionally even help to conceal the wires from view.

In respect of the other objectives of the present invention indicated above, the wires 46 or 56, apart from their good conductivity, must also provide reliable galvanic contact with the conducting layer.

FIG. 2 shows an alternative embodiment in which the field of view of the heating coating 2 is divided by the separating lines 24. The separating lines 24 may pass entirely through the series of layers down to the surface of the substrate, or else they may penetrate only as far as the conducting layer close to the substrate. They subdivide the laminated system, which is itself continuous, into parallel current branches between the regions 6 and 6'. Various techniques exist for producing such separating lines, among which laser cutting is currently the most practical, as it is the most economic regarding the result.

In particular, the separating lines that can be produced by laser cutting are extremely narrow and only perceptible to the naked eye with difficulty.

If FIG. 2 is taken as representing the view seen by the driver of a vehicle (in a left-hand drive vehicle) he will therefore usually have to look through the surface part in which the separating lines 24 are the closest together. The purpose of these lines is to concentrate the current flow through the coating 2 in the field of view A precisely in this primary viewing region so as to deliver therein the highest heating power when visibility is obstructed by snow, ice or condensed water droplets, and to contribute to clear vision as quickly as possible.

Here again, the arrangement of the separating lines 24 has been shown only schematically, and conclusions may be drawn regarding actual configurations only under certain conditions. It is also not always appropriate to incorporate separating lines that are always continuous, rather it is conceivable to produce some or all of them as segmented separating lines, so to speak dotted lines, or to provide, instead of longer separating lines, short individual sections in order to deflect the current in predefined branches. However, this solution is also known per se from document DE 36 44 297 A1 mentioned here.

Short transverse lines depicting transverse conducting structures 49 can be seen in FIG. 2, as in FIG. 1, at the free ends of the strands 46.

There may also be contact points in accordance with the present invention at which the strands 46 are connected to the conducting layer that lies beneath via an additional conductive material. Over and above the pure function of establishing contact, these contact points here are also produced in the form of current distributors. This aspect will also be discussed in further detail by means of FIGS. 4 to 7. A dot-dash circle, identified by VII, defines a detail that can be recognized in greater detail in FIG. 7.

It should be expressly pointed out that no obligatory combination exists between a laminated system provided with separating lines 24 and the contact points shown, rather that the latter may of course also be provided in a configuration as in FIG. 1 with no separating lines.

FIG. 3 shows a sectional view through the edge of the windowpane 1 along the line III-III of FIG. 1. Two rigid individual panes 1, 12 (made of glass or plastic) and an electrically insulating adhesive layer or sheet 13, which is optically clear and transparent and joins the panes together by adhesive bonding in the usual manner, may be seen. This adhesive layer is subdivided horizontally by dotted lines so as to indicate that it is in fact considerably thicker than the laminated system producing the transparent heating coating 2 deposited on the lower pane 12. This coating is shown shaded gray here for the sake of visibility. The adhesive sheet may be formed in the usual manner by a PVB film with a thickness of about 0.76 mm.

The references of FIGS. 1 and 2 have been preserved. It can be recognized that the heating coating 2, the outer border region of which is divided by the separating line 20, lies on the pane 12 below the busbar 5 and below the grid element formed by the strand 56 attached to the latter, which has been applied here in the form of screen-printed structures after the coating 2 has been deposited. The opaque colored layer 3 here is printed on that surface of the pane 1 which is located on the inside of the composite and covers, in the vertical projection (the viewing direction), the separating line 20, the busbar 5 and that section of the strand 56 which is connected directly to said busbar. However, this strand extends beyond the general field of view of the windowpane 1 depicted by the edge 30 of the opaque colored layer 3.

The busbar 5 is shown here in the form of two thin superposed metal strips that include between them one of the ends of the strand 56. This allows good electrical contact between the wire (made of tungsten) and the generally tinned metal strips to be guaranteed. In addition, it is schematically suggested that the metal strip facing the heating coating 2 is embedded in the layer for protecting the latter. Appropriate measures will be taken in accordance with the prior art in order to establish reliable electrical connections between the busbars and the conducting layer.

The region 6' of FIG. 1 is again suggested here. It is easier to show here that its width is made up of the width of the busbar 5 and of the length of the strands 56.

It is easy to recognize that the strand 56 essentially rests on the protective (dielectric) layer of the laminated system. A contact point 47 is consequently suggested at its free end, which lies in the field of view B of the windowpane, at which point the strand 56 is connected to the conducting layer.

FIG. 4 shows an enlarged view of a first embodiment of the contact point 47 according to FIG. 3. The internal structure of the laminated system comprises a protective layer 26' on top and a protective layer 26 on the bottom, which flank a conducting layer 27 included between them. The free end of the strand 56 has been pushed sufficiently far through the upper protective layer 26' in the laminated system at the contact point 47 to obtain a secure electrical contact with the conducting layer 27.

Of course, the strand 56 must be appropriately fastened to the upper protective layer at this stage of the manufacture. This may be achieved using a transfer film 53 for example, which is shown here in the form of a dot-dash line above the strand 56. After the contact point has been produced, the transfer film is either removed and replaced with the adhesive sheet 13, or it remains in place, if it is made of the same thermoplastic (PVB) as the adhesive sheet 13 or a material compatible with the latter, in the final composite, and fuses with the adhesive sheet 13 during the thermal assembly process. Unlike the representation, provision may be made for the free end of the strand to project slightly above the transfer film so that the latter does not impede the mechanical effect.

FIG. 5 shows another embodiment of the contact point 47 produced here by adding a conductive material. This material may be added by screen printing, for example by means of a screen-printing template that is laid on the wires of the fastened strands 56. It may be supposed that the relatively granular material (a glass frit having a high proportion of silver), under the pressure of the squeegee, also transpierces the upper protective layer 26' and part of the conducting layer 27 (or later on by diffusion during the firing operation) so that in all cases it establishes an electrical bridge or a contact point between the wire of the strand 56 and the conducting layer 27. Here again, the wires to be covered may be held in place by means of a transfer film, the ends of the wires having, here again, to project above the film.

If, unlike the representation shown in FIG. 3, printed busbars 4 and 5 are used, they may then be manufactured together with the additional conductive material during one and the same operation and using the same screen-printing paste. No other particular operation is any longer necessary thereafter in order to establish electrical contact between the wires and the busbars.

FIG. 6 shows yet another alternative embodiment in which an additional contact material has already been applied (for example printed) on the pane 12 before the laminated system has been deposited (preferably during a single operation with the associated busbar). The wires of the strands 56 are then deposited and, if required, once again covered with a small spot or band of additional material in a manner similar to FIG. 5.

It is judicious in this embodiment to apply the additional material not at discrete points on the pane 12, but in the form of a line so that no excessive constraints as regards the precision in positioning the wires exist. This gives rise to configurations such as those already suggested in FIG. 2 and now shown in even greater detail by means of FIG. 7.

FIG. 7 shows, as the detail (circle VII) of FIG. 2, a top view of the free ends of two strands 46 in combination with a transverse conducting structure 49 in wire form, and forming a wire contact point 47 that has been produced by straight application of an additional conductive material as in FIG. 5 or 6. The edge of a transfer film 43 is suggested here by dotted lines and here again is slightly set back relative to the free ends of the strands 46. The thickness ratios are unable to be drawn to scale here—the wires of the strands 46 are generally thinner than the lines, as fine as they are, of applied additional conductive material. It should be understood that the line of the transverse conducting structure 49, apart from its bridge function toward the conducting layer, also extends in such a way that it electrically connects the two strands 46 and at the same time also serves to broaden the input/output line for the current between the wires and the conducting layer. It is obvious that such an arrangement, which is always very visually discreet, makes it possible even better to prevent the formation of hot spots at the contact points.

The invention claimed is:

1. A transparent windowpane comprising:
   at least two busbars;
   a resistive heating coating that extends over a substantial part of a surface of the windowpane and over a main field of view, the resistive coating being electrically connected, at least indirectly, with the at least two busbars;
   a heating field including at least one semiresistive region in direct contact with at least one of the at least two busbars, the at least one semiresistive region including wire conducting strands extending away from the at least one of the at least two busbars; and
   a transverse conducting structure in electrical contact with the semiresistive region, the transverse conducting structure being disposed so as to extend in a direction that is transverse with respect to a direction of extension of the wire conducting strands,
   wherein an ohmic resistance of the wire conducting strands is less than an ohmic resistance of the heating coating,
   wherein when a power supply voltage is applied between the at least two busbars, a current flows between the busbars, heating the heating field in the heating coating, and
   wherein at least one of the wire conducting strands intersects the transverse conducting structure in the semiresistive region.

2. The windowpane as claimed in claim 1, wherein the transverse conducting structure is positioned at an end of the conducting strand furthest away from the busbar.

3. The windowpane as claimed in claim 1, wherein the transverse conducting structure is in electrical contact with a plurality of wire conducting strands.

4. The windowpane as claimed in claim 1, wherein the semiresistive region includes a plurality of transverse conducting structures.

5. The windowpane as claimed in claim 1, wherein one or more transverse conducting structures are located on a substrate carrying the heating coating, beneath the heating coating.

6. The windowpane as claimed in claim 1, wherein one or more transverse conducting structures are located on a substrate carrying the heating coating, on the heating coating.

7. The windowpane as claimed in claim 1, wherein one or more transverse conducting structures are located on an adhesive sheet of the windowpane.

8. The windowpane as claimed in claim 1, wherein the transverse conducting structure includes one or more lines and/or one or more bands.

9. The windowpane as claimed in claim 8, wherein the one or more lines and/or one or more bands are straight, as seen by projection on a surface of the windowpane.

10. The windowpane as claimed in claim 8, wherein the one or more lines and/or one or more bands are curved, as seen by projection on a surface of the windowpane.

11. The windowpane as claimed in claim 1, wherein one or more transverse conducting structures are essentially oriented perpendicular to an overall longitudinal projection of the at least one wire conducting strand.

12. The windowpane as claimed in claim 1, wherein the transverse conducting structure extends within the heating field only outside of a main field of view of the windowpane.

13. The windowpane as claimed in claim 1, wherein the wire conducting strands and the transverse conducting structure do not have a thickness or a width greater than 0.5 mm, measured by projection on a surface of the windowpane.

14. The windowpane as claimed in claim 1, further comprising a plurality of transverse conducting structures,
   wherein the plurality of transverse conducting structures have uniform gaps therebetween.

15. The windowpane as claimed in claim 1, further comprising a plurality of transverse conducting structures that each intersect at least one of the wire conducting strands,
   wherein each of the plurality of transverse conducting structures is of a same length.

16. The windowpane as claimed in claim 1, wherein the transverse conducting structure is only located on a part of a longitudinal projection of one or more or all of the busbars.

17. The windowpane as claimed in claim 1, wherein the windowpane is a vehicle windshield, and
   wherein the at least one semiresistive region that includes the transverse conducting structure extends at most up to a boundary of a standardized field of view of the windshield.

18. The windowpane as claimed in claim 1, wherein the heating coating is divided by separating lines in a general field of view, the separating lines dividing the heating coating into current paths.

19. The windowpane as claimed in claim 1, wherein the heating coating in the at least one semiresistive region has a greater conductivity than the heating coating outside the at least one semiresistive region, and
   wherein the at least one semiresistive region includes the at least one wire conducting strand intersecting the transverse conducting structure.

20. The windowpane as claimed in claim 1, wherein the windowpane is a composite windowpane and comprises:
   two rigid panes, made of glass and/or plastic, and
   an adhesive sheet that connects the two panes via principal faces thereof, and
   wherein the heating coating, the at least two busbars, the conducting strands, and the transverse conducting structure are located on one or more surfaces that are within the composite windowpane.

21. The windowpane as claimed in claim 20, wherein the adhesive sheet is electrically conducting in a part of the at least one semiresistive region, the part corresponding substantially to the an area including the at least one wire conducting strand intersecting the transverse conducting structure.

22. A method of heating a windowpane, the method comprising:
   providing the windowpane as claimed in claim 1; and
   supplying electric current to the windowpane via the at least two busbars, such that the current in a part of the heating field that is not in contact with the wire conducting strands, and in a main field of view of the windowpane, flows essentially parallel to an overall longitudinal projection of the wire conducting strands despite the presence of the transverse conducting structure.

23. The method as claimed in claim 22, wherein, when the heating coating is divided by separating lines in a general field of view, which divide the heating coating into current paths, the separating lines concentrate the current flow through the main field of view.

24. A process for manufacturing a windowpane as claimed in claim 1, wherein the process including:
   depositing the heating coating, and
   printing one or more transverse conducting structures and/or at least some of the wire conducting strands on a substrate after the heating coating has been deposited.

25. The process for manufacturing a windowpane as claimed in claim 24, the process further including:
   printing one or more transverse conducting structures and/or at least some of the wire conducting strands on the substrate before the heating coating has been deposited.

26. The process for manufacturing a windowpane as claimed in claim 24, wherein the one or more transverse conducting structures are printed by screen printing or by inkjet printing.

27. The process for manufacturing a windowpane as claimed in claim 24, wherein the transverse conducting structure and/or at least some of the wire conducting strands are electrically connected to the semiresistive region and optionally connected directly to the heating coating, by brazing, at least at discrete contact points.

28. The process for manufacturing a windowpane as claimed in claim 27, wherein the contact points are produced by a mechanical action intended to transpierce at least one dielectric protective layer on the one or more transverse conducting structures and/or at least some of the wire conducting strands.

* * * * *